United States Patent

Weisgerber et al.

[11] Patent Number: 5,275,247
[45] Date of Patent: Jan. 4, 1994

[54] POWERTRAIN-DRIVEN ELECTROMAGNETIC REAR STEERING SYSTEM

[75] Inventors: Thomas W. Weisgerber; Jeffery A. Zuraski; James W. Babineau; Brian P. McDonald, all of Saginaw, Mich.

[73] Assignee: General Motors Corporation, Detroit, Mich.

[21] Appl. No.: 886,217

[22] Filed: May 21, 1992

Related U.S. Application Data

[62] Division of Ser. No. 638,242, Jan. 7, 1991, Pat. No. 5,147,004.

[51] Int. Cl.[5] .............................................. B60K 25/08
[52] U.S. Cl. .................................. 180/53.6; 180/79.3; 280/91; 74/13; 475/323; 475/329
[58] Field of Search ................. 180/53.6, 53.61, 53.62, 180/53.8, 140, 148, 79.1, 79.3; 280/91, 98, 99; 74/11, 13, 14, 422, 421 R; 74/665 R; 475/323, 325, 329; 74/15.4; 74/15.69

[56] References Cited

U.S. PATENT DOCUMENTS

| | | | |
|---|---|---|---|
| 876,070 | 1/1908 | MacFarren | 180/79.3 |
| 1,454,178 | 5/1923 | Moore | 180/79.3 |
| 2,252,967 | 8/1941 | Forton | 74/421 R |
| 2,424,617 | 7/1947 | Hoyle | 180/70.3 |
| 2,900,835 | 8/1959 | Winkelmann et al. | 74/388 |
| 2,967,980 | 1/1961 | Ovshinsky | 317/123 |
| 2,978,058 | 4/1961 | Orr | 180/79.3 |
| 2,987,132 | 6/1961 | Reiter | 180/1 |
| 4,078,438 | 3/1978 | Starbard | 74/34 |
| 4,467,885 | 8/1984 | Furukawa et al. | 180/140 |
| 4,496,016 | 1/1985 | Unsworth et al. | 180/53.6 |
| 4,741,409 | 5/1988 | Westercamp et al. | 180/79.1 |
| 4,779,471 | 10/1988 | Rettig | 74/13 |
| 5,135,066 | 8/1992 | Kashihara | 180/79.1 |

FOREIGN PATENT DOCUMENTS

| | | | |
|---|---|---|---|
| 002722 | 1/1988 | Japan | 180/53.6 |
| 1206211 | 9/1970 | United Kingdom | 180/79.3 |

Primary Examiner—Margaret A. Focarino
Assistant Examiner—A. M. Boehler
Attorney, Agent, or Firm—Howard N. Conkey; A. Luke Simon; Mark A. Navarre

[57] ABSTRACT

A rear steering system in which a rotary mechanical input obtained from one of the rear wheels is controllably applied to a rear steering rack through an electromagnetic clutch apparatus operated by an electronic control unit. The rotary mechanical input is achieved with a flexible cable gear driven by the rear wheel. The cable provides a rotary mechanical input to a magnetic particle clutch assembly, which in turn, interfaces with the rear steering rack via a bevel gearset. The clutch assembly is controlled by an electronic control unit which responds to a variety of system parameters such as the front and rear rack positions, forward/reverse indication and the speed of the vehicle.

6 Claims, 6 Drawing Sheets

POWERTRAIN-DRIVEN ELECTROMAGNETIC REAR STEERING SYSTEM

This is a division of application Ser. No. 07/638242 filed on Jan. 7, 1991 now U.S. Pat. No. 5,147,004.

This invention relates to a steering system for the rear wheels of a motor vehicle, and more particularly, to a system in which mechanical energy used for steering the wheels is obtained from a rotary powertrain member.

BACKGROUND OF THE INVENTION

State-of-the-art mechanically driven rear steering systems typically include a steering shaft linking the front and rear steering racks to provide the desired front-to-rear steering relationship. In addition, there are electrically driven systems in which the position of the front steering rack is sensed, and one or more electromechanical actuators are employed to position the rear wheels. Other systems steer the rear wheels hydraulically with fluid pressure obtained from an engine-driven pump.

SUMMARY OF THE PRESENT INVENTION

The present invention is directed to an improved steering system in which a rotary mechanical input obtained from the powertrain is controllably applied to a rear steering rack through an electromagnetic clutch apparatus operated by an electronic control unit.

In one embodiment, the rotary mechanical input is supplied by one of the rear wheels through a flexible cable driven by a gear mechanism in the wheel hub. The cable is an input to a magnetic particle clutch assembly which interfaces with a rear steering rack via a bevel gearset.

The clutch assembly includes a first (right-hand) magnetic particle clutch for transmitting the rotary mechanical input to one side of the bevel gearset, and a second (left-hand) magnetic particle clutch for transmitting the rotary mechanical input to the other side of the bevel gearset. The bevel gear drives a pinion engaging the rear steering rack so that actuation of the right-hand clutch establishes a mechanical drive between the cable and the rack for steering the rear wheels to the right, while actuation of the left-hand clutch establishes a mechanical drive between the cable and the rack for steering the rear wheels to the left. In the illustrated embodiment, the rack, gears and clutch assembly are contained within a housing which is fixed to the frame of the vehicle.

If rear steering is not required when the vehicle is moving backwards, the clutch assembly may be simply disengaged to unload the drive cable during reverse operation. If rear steering is desired when the vehicle is moving backward, the gear mechanism at the wheel hub must be unidirectional to avoid unwinding the drive cable. In this case, the gear mechanism comprises a first gear train which transmits torque only when the wheel is rotating clockwise and a second gear train which transmits torque only when the wheel is rotating counterclockwise. A pair of internal one-way clutches connecting the first and second gear trains to the cable ensure that the cable is only driven in a single direction which will not unwind the drive cable.

The embodiment of the present invention is adapted specifically for vehicles having a rear wheel drive powertrain, the magnetic particle clutch assembly is directly driven by the differential gearset of the powertrain. In this embodiment, a bevel gear establishes a mechanical drive between the ring gear of the differential gearset and the magnetic particle clutch input. In this case, the right-hand and left-hand clutches drive separate inputs of a compound planetary gearset which provides the correct direction of torque on the output pinion gear.

Control of the magnetic particle clutch assembly in either embodiment is provided by an electronic control unit, based on various input conditions such as front steering angle, vehicle speed and a forward/reverse indication. If for any reason, electrical power to the system is interrupted, or if the control unit detects an abnormal condition, the electromagnetic clutches are deactivated, and a mechanical center-and-lock mechanism is activated to return the rear wheels to a straight-ahead position. Once the rack is so centered, the center-and-lock mechanism remains active until overridden by the control unit.

Although the rear steering system of this invention is illustrated herein as a stand-alone system, it will be understood that it can be employed as part of a four-wheel steering system in which a single controller coordinates the steering of both front and rear wheels.

DETAILED DESCRIPTION OF THE DRAWINGS

Figure 1:
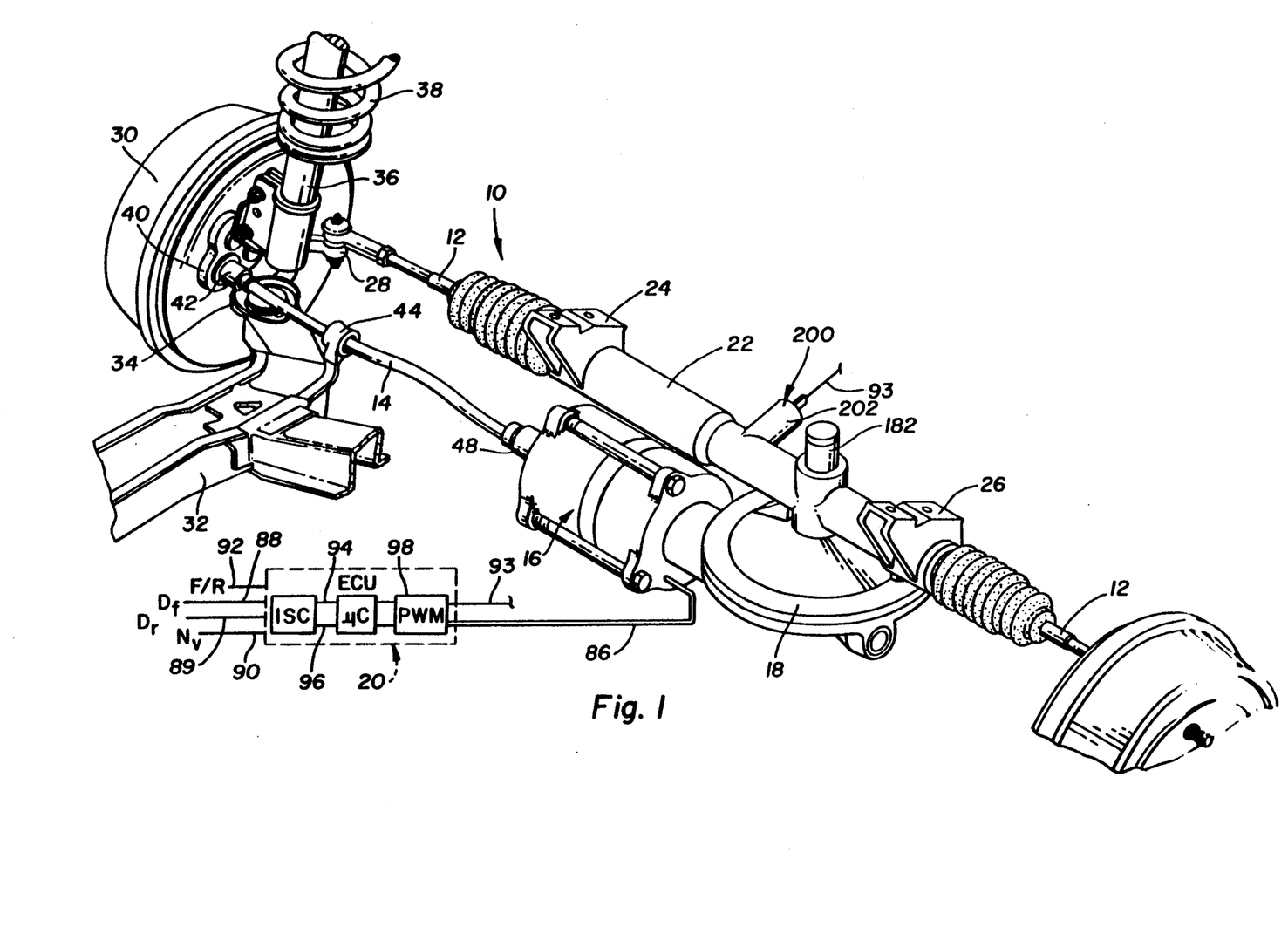
FIG. 1 is a system diagram illustrating a first embodiment of the steering system of this invention, including a rear steering rack, a wheel mounted cable drive mechanism, a magnetic particle clutch assembly and a stand-alone computer-based control unit for controlling the energization of the clutch assembly.

Referring to FIG. 1, the reference numeral 10 generally designates a rear steering system according to this invention, as applied to a front wheel drive vehicle. The system 10 includes a rear steering linkage 12, a flexible cable 14, a dual magnetic particle clutch assembly 16, a bevel gearset 18 and an electronic control unit 20.

The linkage 12 is supported in a rack housing 22, which in turn, is mounted on a vehicle support member (not shown) via the brackets 24, 26. Each end of the linkage 12 is connected to a pivotable knuckle 28, as indicated at the rear wheel 30. Each rear wheel 30 is supported on the frame rail 32 in a conventional manner via a steerable ball joint 34 to which the knuckle 28 is connected. The sprung mass of the vehicle is supported on the ball joint 34 in a conventional manner by a strut 36 and spring 38.

The flexible cable 14 is driven by the wheel 30 through a reduction gearset mounted in the wheel bearing housing 40. The driven end of cable 14 is secured to the housing 40 with a fastener 42, the cable 14 being supported at its midsection by the frame rail bracket 44. The driving end of the cable 14 is secured to the housing 46 of clutch assembly 16 by the fastener 48.

Figure 2:
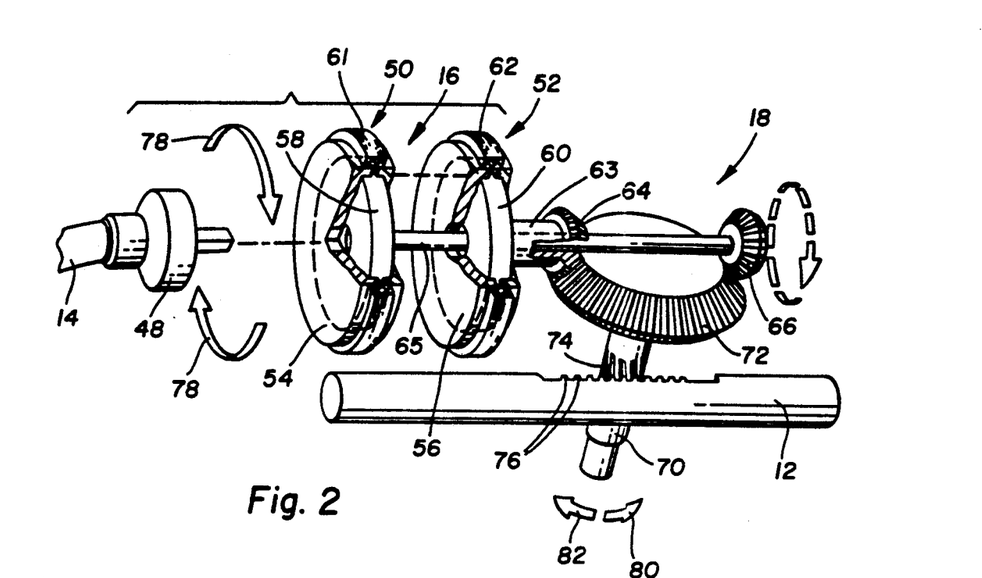
FIG. 2 is a schematic representation of the rear steering rack and clutch assembly of FIG. 1.

As seen more clearly in the schematic view of FIG. 2, the clutch assembly 16 comprises a pair of coaxial magnetic particle clutches 50 and 52, referred to herein as left-hand and right-hand clutches. Each clutch 50, 52 comprises an input member or drum 54, 56 which is directly rotated by the cable 14, an output member or disk 58, 60 supported for rotation within the respective drum 54, 56, a stationary exciting coil 61, 62 energizable to mechanically couple the respective drum and disk and a coil housing (not shown). The right-hand clutch disk 60 is connected to the hollow shaft 63, which in turn, is connected to the side gear 64 of bevel gearset 18. The left-hand clutch disk 58 is connected to the shaft 65 which is coaxial with and disposed within the shaft 63. The shaft 65, in turn, is connected to the side gear 66 of bevel gearset 18. The shaft 70 of bevel gear 72 has pinion teeth 74 formed thereon which are maintained in meshing engagement with the teeth 76 of the steering linkage 12.

In operation, forward rotary motion of the wheel 30 rotatably drives the cable 14, which in turn, provides a clockwise rotary mechanical input to the clutch assembly 16, as indicated by the arrows 78 in FIG. 2. When the exciting coil 61 of left-hand clutch 50 is energized, the clockwise mechanical input of cable 14 is transmitted to the side gear 66, which drives the bevel gear shaft 70 in the direction of arrow 80. This moves the linkage 12 axially in a right-hand direction, as viewed in FIG. 2, to effect a first change in the vehicle heading, as perceived by the driver. When the exciting coil 62 of right-hand clutch 52 is energized, the clockwise mechanical input of cable 14 is transmitted to the side gear 64, which drives the bevel gear shaft 70 in the direction of arrow 82. This moves the linkage 12 axially in a left-hand direction, as viewed in FIG. 2, to effect a second opposite change in the vehicle heading as perceived by the driver.

The amount of mechanical rotary torque imparted to the bevel gear 72 depends on the energization of the respective clutch coil 61, 62. In general, there is a direct relation between the coil current and the magnitude of torque transmitted.

The computer-based control unit 20 controls the energization of the clutch assembly coils 61, 62 via cable 84 in response to a number of inputs, including the front rack position signal $D_f$ on line 88, the rear rack position signal $D_r$ on line 89, the vehicle speed signal $N_v$ on line 90 and a forward/reverse (F/R) signal an line 92. The front and rear rack position signals $D_f$, $D_r$ may be obtained from conventional rotary potentiometers, as described below in reference to FIG. 4. The vehicle speed signal $N_v$ may be obtained with a conventional speed pickup (not shown) responsive to the rotation of the cable drive gearing, or other rotary vehicle speed related member, and the F/R signal may be obtained from a conventional transmission range selector switch (not shown). An additional output is provided on line 93 for controlling the energization of a solenoid operated rack lock, described below in reference to FIG. 6.

The above-described input signals are applied to an input signal conditioning circuit (ISC) of control unit 20 from which they are accessible to a microcomputer uC via data and address buses 94, 96. In performing the energization of the clutch coils, the microcomputer executes a series of program instructions for carrying out a suitable control of the clutches 50 and 52. The output current is applied to the clutch coils through pulse-width-modulation (PWM) of a DC voltage source derived from the vehicle storage battery (not shown). The microcomputer develops a PWM command and applies it to a conventional PWM driver circuit 98.

As indicated above, a gearset in the housing 40 functions to provide a unidirectional (counterclockwise) drive of the cable 14 in response to rotation of the wheel 30. The unidirectional nature of the drive is required for cable durability under load. If rear steering is only desired when the vehicle is moving in the forward direction, a simple reduction gearset may be employed and the clutch assembly 16 may be simply disengaged during rearward vehicle movement to unload the drive cable 14.

Figure 3:
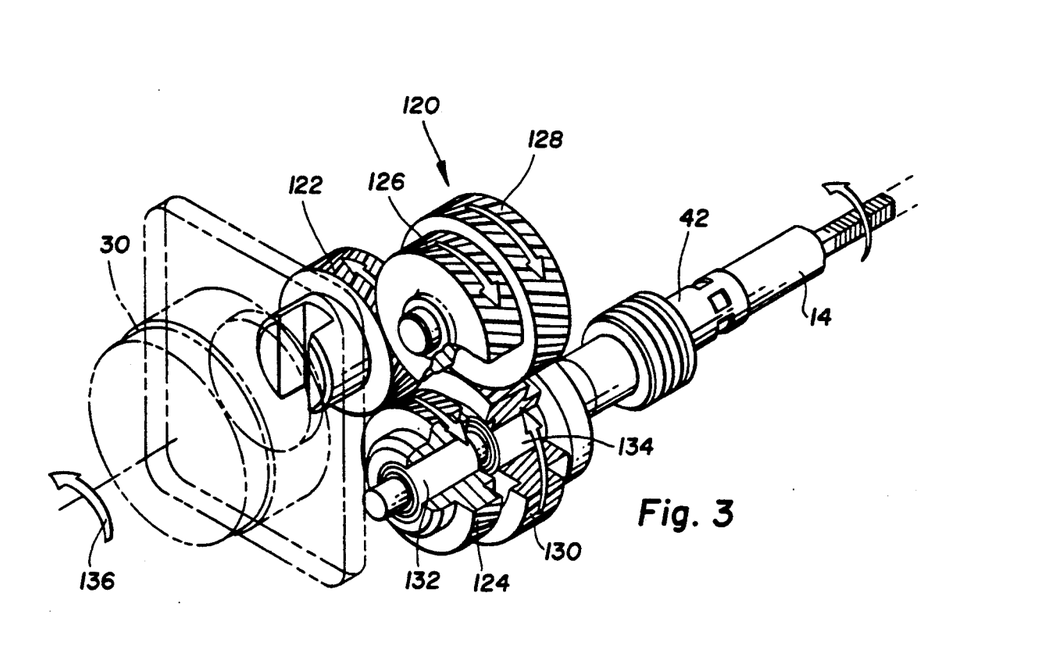
FIG. 3 is a schematic representation of a unidirectional cable drive mechanism for the embodiment of FIG. 1.

If rear steering is desired, regardless of the direction of vehicle movement, a more complicated gear arrangement is required to ensure that the cable 14 will always be driven in the counterclockwise direction. Referring to FIG. 3, such an arrangement is generally designated by the reference numeral 120. The gear arrangement 120 comprises two gear trains, both driven by an input gear 122 which is rigidly coupled to the wheel 30. The first gear train comprises the input gear 122 and the output gear 124. The second gear train comprises the input gear 122, the transfer gears 126 and 128 and the output gear 130. The output gears 124 and 130 are coupled to the cable 14 via internal one-way or roller clutches 132 and 134, respectively, so that only counterclockwise rotation can be coupled to the cable 12. When the wheel 30 is rotating in the counterclockwise direction, as indicated by the arrow 136, the output gear 124 is rotated clockwise, while the output gear 130 and the transfer gears 126, 128 are rotated counterclockwise, as indicated by the arrows. In this case, the one-way clutch 134 couples the counterclockwise rotation of output gear 130 to the cable 14, and the output gear 124 freewheels. When the wheel 30 is rotating in the clockwise direction, the output gear 124 is rotated counterclockwise, while the output gear 130 and the transfer gears 126, 128 are rotated clockwise. In this case, the one-way clutch 132 couples the counterclockwise rotation of output gear 124 to the cable 14, and the output gear 130 freewheels.

Figure 4:
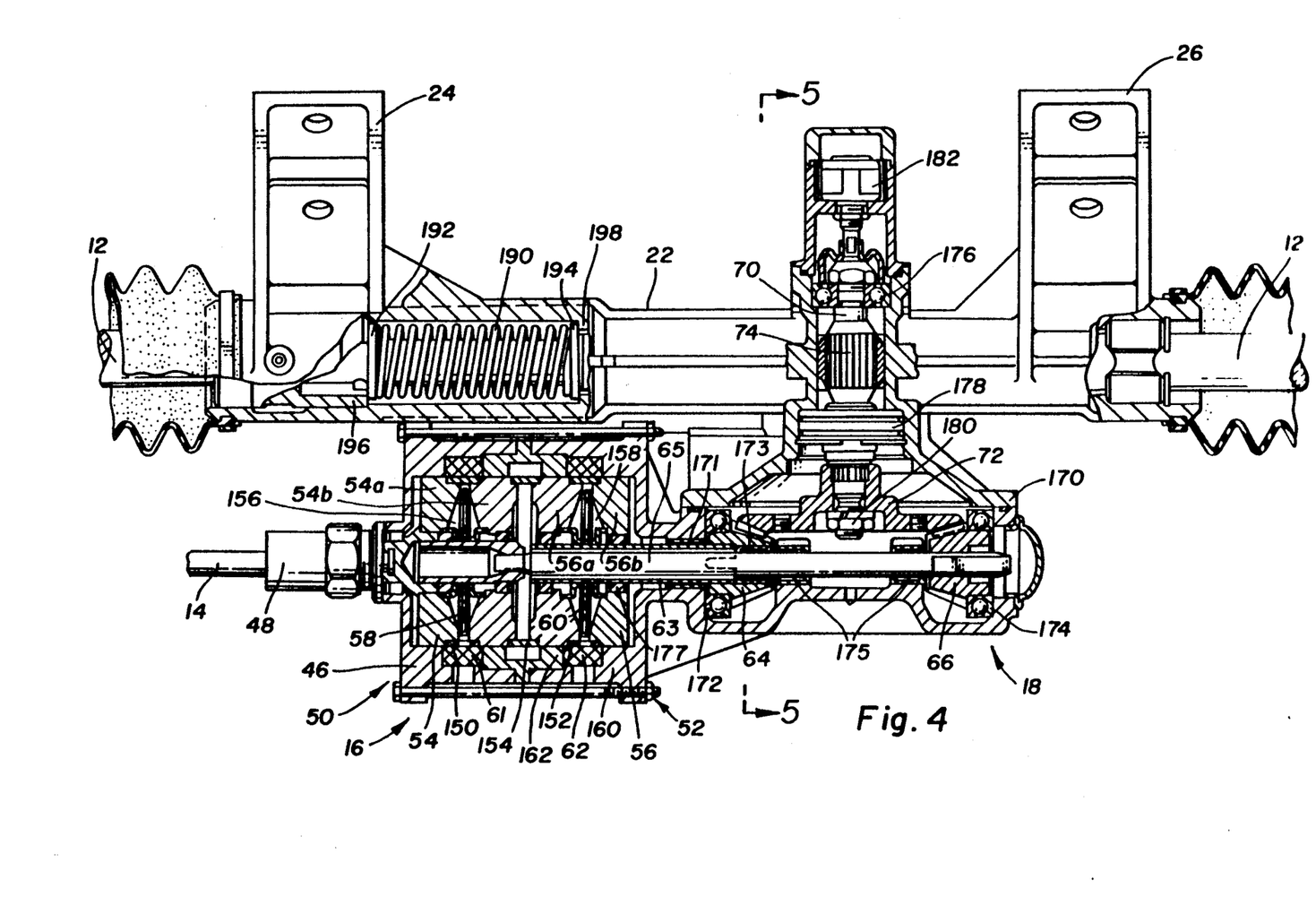
FIGS. 4 and 5 are cross section diagrams illustrating the magnetic particle clutch assembly of FIG. 1.

FIG. 4 depicts sectional views of the clutch assembly 16 and bevel gearset 18, and a partial sectional view of the rack housing 22. The reference numerals employed in FIGS. 1-2 have been repeated where appropriate. FIG. 4 reveals several features and construction details not specifically shown in FIGS. 1-2, including the details of the clutch assembly 16 and bevel gearset 18, a position transducer 182 for the shaft 70 of bevel gear 72, and a rack centering spring 190.

Referring first to the dual magnetic particle clutch assembly 16, the input drum 54, 56 of each clutch 50, 52 comprises a pair of ferromagnetic pole pieces 54a, 54b; 56a, 56b mechanically coupled by a nonmagnetic sleeve 150, 152. The pole pairs 54a, 54b and 56a, 56b, in turn are mutually coupled by the nonmagnetic sleeve 154. Each pole pair 54a, 54b; 56a, 56b defines a cavity 156, 158 within which the respective clutch disks 58, 60 are rotatably disposed. As indicated in reference to FIG. 2, the clutch disk 58 is mounted for rotation with the shaft 65, and the clutch disk 60 is mounted for rotation with the shaft 63. A portion of each cavity 156, 158 is filled with a ferromagnetic powder which can be operated on by a magnetic field, as described below, for transmitting torque from the respective rotating pole pieces to the respective clutch disk.

The coils 61 and 62 are disposed about the clutch disks 58 and 60 in a multi-element housing 160. The housing elements are all ferromagnetic with the exception of nonmagnetic sleeve 162 which provides magnetic isolation between the clutches 50 and 52. In each clutch 50, 52, energization of the respective coil 61, 62 creates a local magnetic field having a flux path which includes the housing elements 160, the pole pieces 54a, 54b; 56a, 56b and the respective cavity 156, 158. When influenced by the magnetic field, the ferromagnetic powder particles contained within the respective cavity 156, 158 become aligned along the axis of clutch assembly 16 between the faces of the respective pole pieces 54a, 54b; 56a, 56b and clutch disks 58, 60. The shear of the powder across the normal magnetic flux lines produces a net tangential force component in the respective cavity, whereby torque is transmitted from the rotating pole pieces 54a, 54b; 56a, 56b to the respective clutch disk 58, 60. In general, the net normal force, and hence the clutch torque transmission, increases with increases in the strength of the magnetic field created by the respective coil 61, 62.

The elements of bevel gearset 18 are disposed within a multi-element housing 170, portions of which may be integral with the rack housing 22 as shown. The side gear 64 is axially and radially supported on bearings 172 and 173, respectively. The side gear 66 is axially and radially supported on bearing 174 and shaft 65, respectively. The shaft 65 is radially supported on sleeve bearings 175, and shaft 63 is supported on bearings 171 and 177. The shaft 70 is retained by the bearings 176 and 178, and the bevel gear 72, in turn, is splined to the shaft 70 and retained by the nut 180. A rotary potentiometer 182 disposed within an unlubricated portion of the bevel gearset housing 170 provides an electrical output signal indicative of the rack position.

Figures 5, 6:
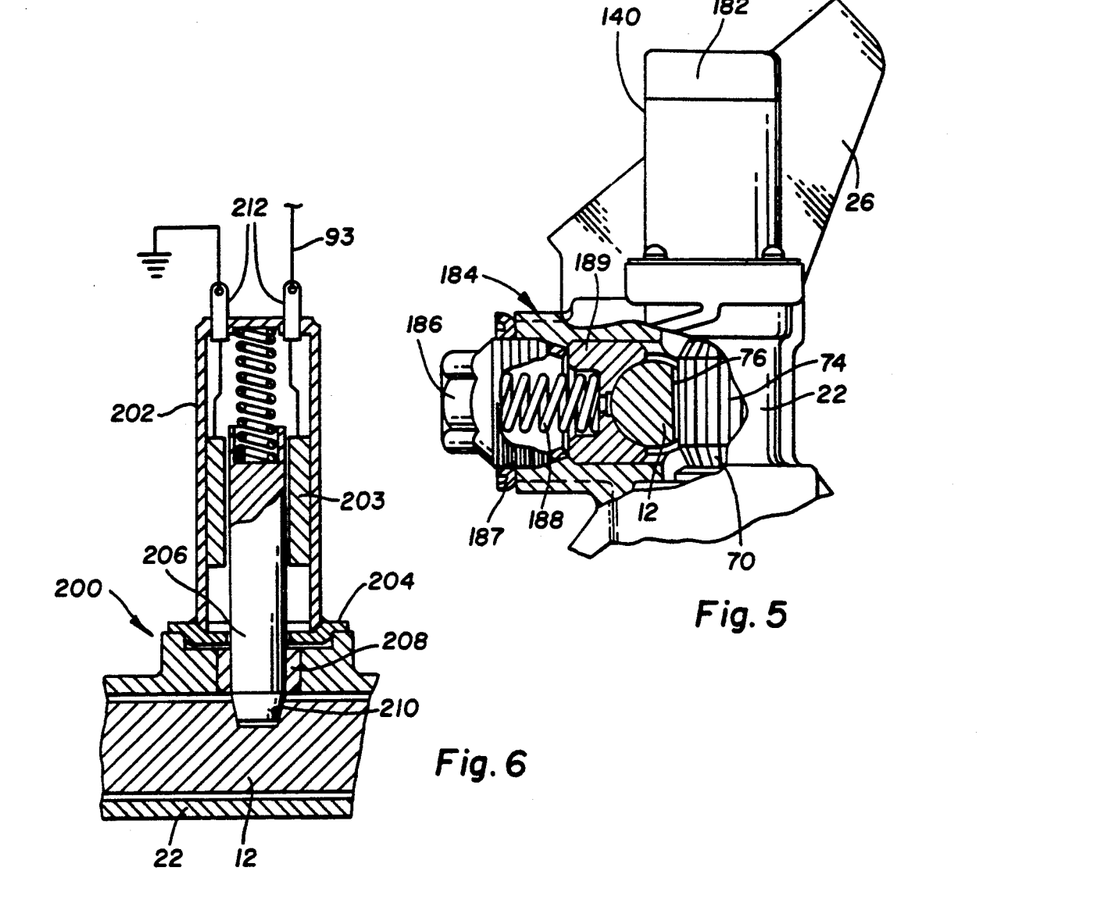
FIG. 6 is a sectional view of a rack locking mechanism for the system of FIG. 1.

As best seen in FIG. 5, the linkage 12 is maintained in engagement with the teeth 74 of bevel gear shaft 70 by a conventional spring loaded contact shoe assembly, generally designated by the reference numeral 184. The nut 186 and retaining ring 187 tension the spring 188 against the contact shoe 189.

A centering spring 190 concentric with the linkage 12 urges the linkage 12 to a centered axial position. The spring 190 is disposed about a reduced diameter portion of the linkage 12 between a pair of spacers 192 and 194. The linkage 12 engages the outer axial faces of each spacer, and the housing shoulders 196, 198 retain the spacers 192, 194 within the rack housing 22. As a result, any axial movement of the linkage 12 from the illustrated center position compresses the spring 190 to develop a centering force which tends to restore the linkage 12 to the center position.

The solenoid operated rack lock mechanism, generally designated by the reference numeral 200 in FIG. 6, cooperates with the centering spring 190 of FIG. 5 to lock the linkage 12 in its centered position in the event of a sensed failure or a loss of electrical power to the steering system. The solenoid 202, mounted on the rack housing 22 via mounting plate 204, includes a tapered plunger 206 spring loaded to the extended position illustrated in FIG. 6. The plunger 206 is supported by the bushing 208, and when fully extended as shown, is received within a recess 210 in linkage 12. In this condition, the linkage 12 is mechanically retained in the center position and no rear steering occurs. The solenoid 202 includes a coil 203 energizable via the electrical terminals 212 for retracting the plunger 206 from the tapered recess 210.

In operation, the solenoid 202 is energized during normal operation of the rear steering system. In this mode, the axial end of plunger 206 is located within the bushing 208 and does not interfere with movement of the linkage 12. In the event of a sensed failure or a loss of electrical power to the steering system, the clutches 50, 52 and solenoid 202 are deenergized. The spring loaded plunger 206 is thereby released and engages the periphery of linkage 12 until the centering spring 190 returns the linkage 12 to the center position. At such point, the plunger 206 extends into the recess 210, locking the rack in the center position. When further operation of the steering system is appropriate, the solenoid 202 is once again energized to retract the plunger 206 to release the linkage 12 for axial displacement by the clutch assembly 16 and bevel gearset 18.

Figure 7:
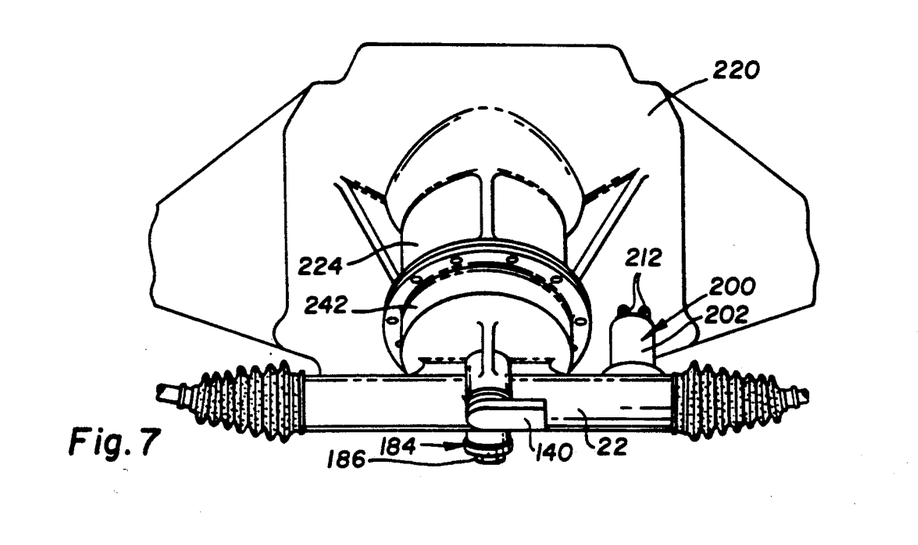
FIG. 7 is a system diagram illustrating a second embodiment of the steering system of this invention where the magnetic particle clutch assembly of FIG. 1 is directly driven by a powertrain differential gearset.
Figure 8:
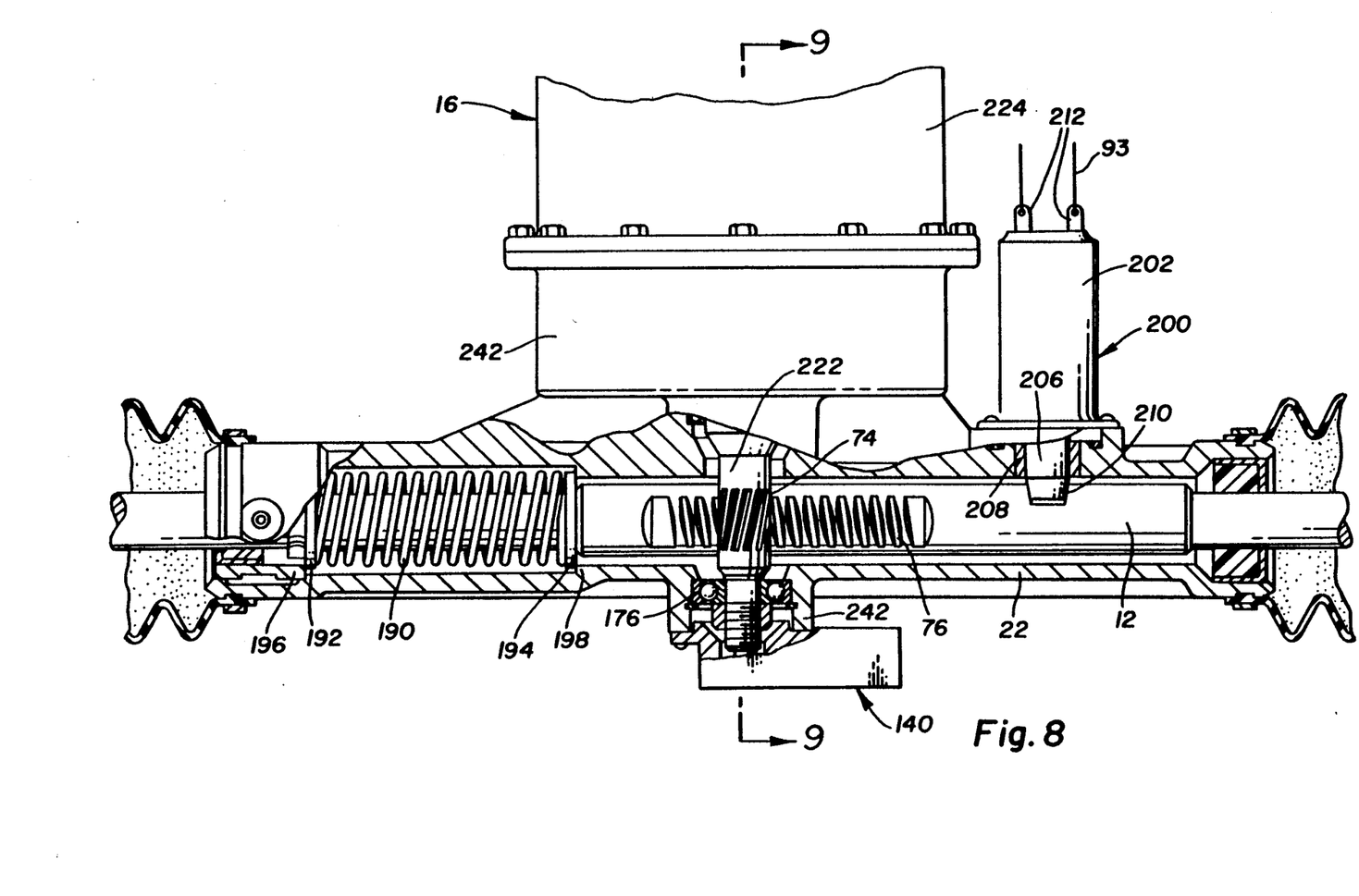
FIGS. 8 and 9 are sectional views of the system depicted in FIG. 7.

FIG. 7 generally depicts a second embodiment of this invention wherein the electromagnetic clutch assembly 16 of FIG. 4 is applied to a rear wheel drive vehicle. In this case, the differential gearset 220 used to deliver motive power to the rear wheels of the vehicle supports the rack housing 22 and provides a rotary input to the clutch assembly 16. The clutch assembly 16 drives a dual planetary gearset mechanism (depicted in FIGS. 9-10), which in turn, drives a pinion shaft 222 (as best seen in FIG. 8) for effecting axial movement of the linkage 12. Where appropriate, the reference numerals of FIGS. 1-6 have been applied to FIGS. 7-10 as well.

Figure 9:
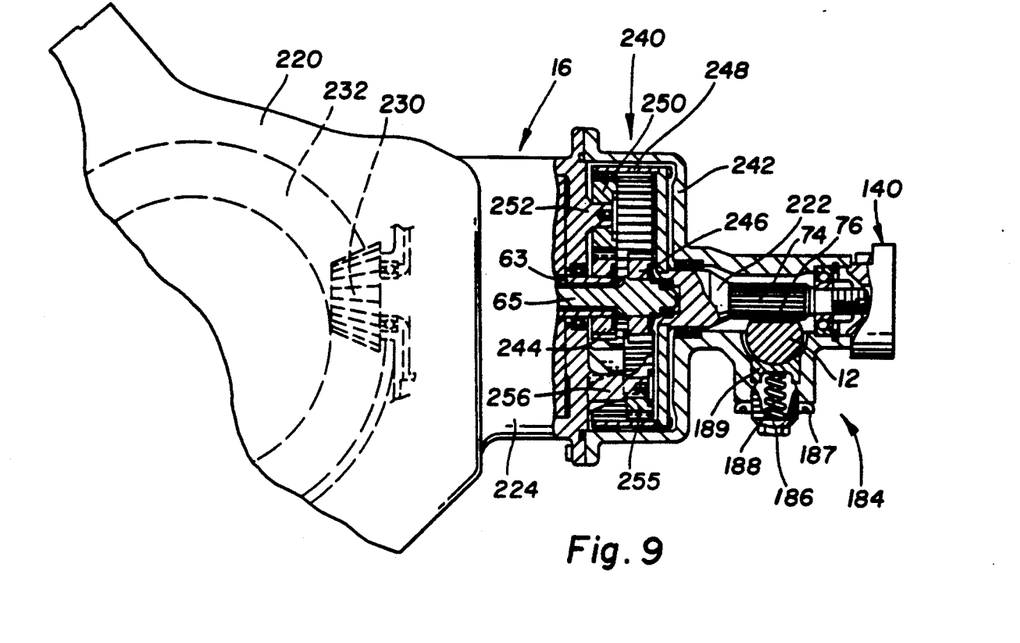

Referring to FIGS. 8-9, it will be seen that the rear drive embodiment likewise includes a centering spring 190 and solenoid operated plunger for locking linkage 12 in the center position, and a contact shoe assembly 184 for maintaining the rack teeth 76 in meshing engagement with the teeth 74 of pinion shaft 222. Also as in the first embodiment, a position transducer assembly 140 is responsive to the pinion shaft movement to provide an indication of the rack position.

The electromagnetic particle clutch assembly 16 is mounted in an extension of the differential gearset housing 224, as best seen in FIG. 9. A hypoid gear 230 is driven by the ring gear 232 of the differential gearset and provides a rotary input to the clutch assembly 16. Unlike the first embodiment, the rotary input of this embodiment is bi-directional—one direction (clockwise) for forward movement of the vehicle, and the opposite direction (counterclockwise) for reverse movement.

The clutch assembly 16 drives the pinion shaft 222 through a dual planetary gearset, designated generally by the reference numeral 240. The pinion shaft 222 and gearset 240 are disposed within a housing 242 attached to the differential housing extension 224 which may be integral with the rack housing 22 as shown. The clutch output shafts 63 and 65 are supported by the housing extension 224 and the pinion shaft is supported by the housing 242. The output shafts 63 and 65 drive a pair of sun gears 244 and 246, and the pinion shaft 222 is driven by a rotary internal (ring) gear 248. A set of inner planet gears 250 mounted on hubs 252 of housing extension 224 connect the sun gear 244 to the ring gear 248 to establish a reverse drive between clutch shaft 63 and pinion shaft 222. A set of compound outer planet gears 254, 255 mounted on hubs 256 connect the sun gear 246 to the ring gear 248 to establish a forward drive between clutch shaft 65 and pinion shaft 222.

Figure 10:
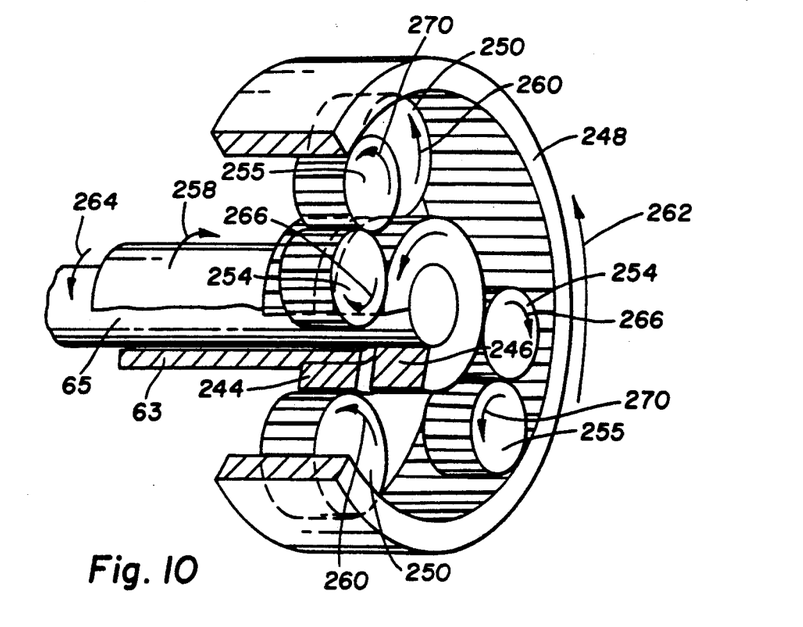
FIG. 10 is a schematic view of the planetary gearset of FIG. 7.

As best viewed in the schematic gear diagram of FIG. 10, a counterclockwise rotary input of clutch shaft 63 (indicated by arrow 258) produces clockwise rotation of planet gears 250 and ring gear 248 (indicated by arrows 260 and 262) for rightward displacement of the linkage 12. A clockwise rotary input of clutch shaft 63 would produce counterclockwise rotation of planet gears 250 and ring gear 248 for leftward displacement of the linkage 12. On the other hand, a clockwise rotary input of clutch shaft 65 (indicated by arrow 264) produces counterclockwise rotation of intermediate planet gears 254 (indicated by arrows 266, clockwise rotation of outer planet gears 255 (indicated by arrow 270) and clockwise rotation of ring gear 248 (indicated by arrow 262) for rightward displacement of the linkage 12. A counterclockwise rotary input of clutch shaft 65 would consequently produce counterclockwise rotation of ring gear 248 for leftward displacement of the linkage 12.

Control of the second embodiment thus requires knowledge of the input direction as well as the required displacement of linkage 12. For example, if rightward displacement of linkage 12 is required (clockwise rotation of ring 248), and the vehicle is moving forward (hypoid gear 230 rotated clockwise), clutch 50 is energized to transmit the clockwise input torque to clutch shaft 65. Were the vehicle moving in the reverse direction (hypoid gear 230 rotated counterclockwise) the controller would energize clutch 52 to transmit the counterclockwise input torque to clutch shaft 63. The opposite conditions occur when leftward displacement of linkage 12 is desired.

While this invention has been described in reference to the illustrated embodiment, it will be recognized that various modifications will occur to those skilled in the art and that systems incorporating such modifications may fall within the scope of this invention, which is defined by the appended claims.

The embodiments of the invention in which an exclusive property or privilege is claimed are defined as follows:

1. Apparatus for steering a rear wheel of a motor vehicle having a rear drive mechanism through which a motive power source drives the rear wheel, the apparatus comprising:

rack and pinion steering means including a rack adapted to steer the rear wheel when axially displaced by rotation of a pinion gear;

drive generating means for developing a rotary steering input utilizing an element of said rear drive mechanism as a rotary drive source, wherein the rotary steering input is bi-directional, rotating in a first direction for forward vehicle movement and in a second direction, opposite said first direction, for reverse vehicle movement;

torque transmitting means for selectively applying said rotary steering input to the pinion gear of said rack and pinion steering mechanism to effect selective displacement of said rack for steering said rear wheel.

2. The apparatus of claim 1, wherein the rear drive mechanism includes a rotary gear element adapted to be driven by said motive power source, and said drive generating means includes an output gear element coupled to said rotary gear element.

3. The apparatus of claim 1, wherein the torque transmitting means includes a first selectively engageable torque transmitting mechanism for applying said rotary steering input to said pinion gear so as to rotate said pinion gear in a first direction and a second selectively engageable torque transmitting mechanism for applying said rotary steering input to said pinion gear so as to rotate said pinion gear in a second direction opposite to said first direction.

4. Apparatus for steering a rear wheel of a motor vehicle having a rear drive mechanism through which a motive power source drives the rear wheel, the apparatus comprising:

rack and pinion steering means including a rack adapted to steer the rear wheel when axially displaced by rotation of a pinion gear;

drive generating means for developing a rotary steering input utilizing an element of said rear drive mechanism as a rotary drive source;

planetary gearing means, comprising a dual planetary gear set having an output element connected to said pinion gear, a first input element adapted to drive said output element through a forward drive establishing mechanism, and a second input element adapted to drive said output element through a reverse drive establishing mechanism;

clutch means including a first selectively activated torque transmitting mechanism for applying said rotary steering input to said first input element to rotate said pinion gear in the same direction as the rotary steering input and a second selectively activated torque transmitting mechanism for applying said rotary steering input to said second input element to rotate said pinion gear in a direction opposite to that of said rotary steering input.

5. The apparatus set forth in claim 4, wherein said clutch means includes a drum element driven by said rotary steering input, a first disk element adapted to transfer torque from said drum element to said first input element and a second disk element adapted to transfer torque from said drum element to said second input element.

6. The apparatus set forth in claim 5, wherein said first and second selectively activated torque transmitting mechanisms are magnetic particle clutches.

* * * * *